(12) United States Patent
Kuan et al.

(10) Patent No.: US 8,236,148 B2
(45) Date of Patent: Aug. 7, 2012

(54) ELECTROLYSIS DEVICE FOR PREPARATION OF HYPOCHLOROUS WATER

(76) Inventors: Yu Wen Kuan, Kowloon (HK); Tze Kei Choi, Kowloon (HK)

( * ) Notice: Subject to any disclaimer, the term of this patent is extended or adjusted under 35 U.S.C. 154(b) by 186 days.

(21) Appl. No.: 12/781,838

(22) Filed: May 18, 2010

(65) Prior Publication Data

US 2010/0288626 A1 Nov. 18, 2010

(51) Int. Cl.
*C25B 1/26* (2006.01)
*C25B 9/08* (2006.01)

(52) U.S. Cl. .......... 204/263; 204/228.1; 204/228.3; 204/252; 204/278.5; 205/500

(58) Field of Classification Search .......... 205/412, 205/556, 620, 621; 204/241, 262, 266
See application file for complete search history.

(56) References Cited

U.S. PATENT DOCUMENTS

| | | | | |
|---|---|---|---|---|
| 998,982 | A * | 7/1911 | Pier | 205/349 |
| 3,390,065 | A * | 6/1968 | Cooper | 205/412 |
| 3,616,444 | A * | 10/1971 | Raetzsch | 204/278 |
| 4,484,991 | A * | 11/1984 | Angelo et al. | 205/412 |
| 5,186,805 | A * | 2/1993 | Gross et al. | 204/265 |
| 5,690,797 | A * | 11/1997 | Harada et al. | 204/228.5 |
| 5,888,361 | A * | 3/1999 | Hirai et al. | 204/262 |
| 7,226,529 | B2 * | 6/2007 | Meltser | 204/263 |
| 2003/0000848 | A1* | 1/2003 | Lipsztajn et al. | 205/556 |
| 2003/0141200 | A1* | 7/2003 | Harada | 205/637 |
| 2006/0113196 | A1* | 6/2006 | Nanjundiah et al. | 205/412 |

* cited by examiner

*Primary Examiner* — Harry D Wilkins, III
(74) *Attorney, Agent, or Firm* — Jason J. Su; Tech Miner, LLC

(57) ABSTRACT

An electrolysis device for preparation of hypochlorous water is provided, comprising an electrolytic cell, and cathodic and anodic electrolytic sheets arranged in the electrolytic cell, wherein the electrolytic cell is separated to form an inner tank for containing hydrochloric acid and an outer tank for circulating tap water, a central portion of the inner tank is sealed and separated relative to the outer tank, and a chlorine discharge outlet connected to the outer tank is provided at the upper end of the inner tank; the cathodic and anodic electrolytic sheets are located on both sides of the inner tank. The electrolysis device without a membrane utilizes tap water and hydrochloric acid as raw materials, having an inner tank for containing hydrochloric acid and an outer tank for circulating tap water. Chlorine generated through electrolysis of hydrochloric acid is discharged from the chlorine discharge outlet and combined with tap water in the outer tank to generate hypochlorous acid. This electrolysis device has simple structure, and can effectively improve productivity of hypochlorous water. Hypochlorous water produced by this electrolysis device has functions of sterilization and environmental protection.

5 Claims, 5 Drawing Sheets

ELECTROLYSIS DEVICE FOR PREPARATION OF HYPOCHLOROUS WATER

FIELD OF THE INVENTION

The present invention relates to an electrolysis device, more specifically, relates to an electrolysis device for preparation of hypochlorous acid water, wherein hydrochloric acid is electrolyzed to produce chlorine which is then mixed with water to generate hypochlorous water containing hypochlorous acid.

BACKGROUND OF THE INVENTION

Hypochlorous acid water, which is acidic electrolyzed water, containing hypochlorous acid molecule (HClO), is a kind of water with PH of 5.0 to 6.5, chlorine concentration of 10-30 mg/L. This hypochlorous water has strong oxidation ability and can kill microorganisms rapidly. Conventional electrolysis devices for preparation of hypochlorous water include an electrolytic cell, and cathodic and anodic electrolytic sheets located within the electrolytic cell. The electrolytic cell is equipped with an ion membrane, which separates the electrolytic cell into an anodic side and a cathodic side. The preparation principle is: water added with salt, NaCl, is electrolyzed through the electrolysis device equipped with the ion membrane; since the anodic side and the cathodic side of the electrolytic cell are separated by the ion membrane, chlorine is generated from the chlorion Cl— at the anode, which is then reacts with $H_2O$ to generate hydrochloric acid (HCl) and hypochlorous acid (HClO), thus water from the anode tank contains 10-50 mg/L available chlorine.

However, the conventional electrolysis devices for the preparation of hypochlorous water have the following problems: 1) the use of the electrolytic cell with an ion membrane to generate hypochlorous water needs ion membranes. The ion membranes are expensive and easy to break during the electrolysis process, hence affecting the efficiency of electrolysis. During the production process with the conventional dual-slot diaphragm electrolysis method, hypochlorous water is generated at the anode tank, and a same amount of alkaline water is obtained at the cathode tank, but the alkaline water has low value; 2) during the electrolysis process, high current will generate heat through the electrolytic sheets. Such heat will increase the impedance of the electrolytic sheets, thereby reducing the current flow to impact chlorine production capacity, and affecting production efficiency of hypochlorous water. It is hence necessary to improve the conventional electrolysis devices for preparation of hypochlorous water.

SUMMARY OF THE INVENTION

Given the disadvantages of the conventional electrolysis devices for preparation of hypochlorous water having complex structure due to the ion membrane and low production rate of hypochlorous water, the present invention is intended to provide an electrolysis device for preparation of hypochlorous water which has simple structure and can improve production rate of hypochlorous water.

In the present invention, an electrolysis device for preparation of hypochlorous water is provided, comprising an electrolytic cell, and cathodic and anodic electrolytic sheets arranged in the electrolytic cell, wherein the electrolytic cell is separated to form an inner tank for containing hydrochloric acid and an outer tank for circulating tap water, a central portion of the inner tank is sealed and separated relative to the outer tank, and a chlorine discharge outlet connected to the outer tank is provided at the upper end of the inner tank; the cathodic and anodic electrolytic sheets are located on both sides of the inner tank.

Advantageously, the outer tank forms an outer space therein to contain tap water, and an inlet for supplying tap water is arranged at the lower side of the outer tank, an outlet for discharging hypochlorous water is arranged at the upper side of the outer tank, both the inlet and the outlet are connected to the outer space.

Advantageously, the chlorine discharge outlet is positioned at the upper end of the inner tank, near the outlet for discharging hypochlorous water, with its height being higher than that of the outlet for discharging hypochlorous water.

Advantageously, the inner tank forms an inner space in its central portion to contain hydrochloric acid electrolyte, and an electrolyte inlet for introducing hydrochloric acid is arranged at the lower end of the inner tank, both the electrolyte inlet and the chlorine discharge outlet are connected to the inner space.

Advantageously, a central electrolytic sheet is arranged in the central portion of the inner tank, separating the inner tank into section A, section B and section C, wherein the section A is an electrolyte buffer area, the section B and the section C are electrolysis areas, and the electrolyte inlet is arranged in the section A, the cathodic and anodic electrolytic sheets are arranged in the section C and the section B respectively.

Advantageously, the electrolytic cell is tilted 20°~40°, or only the inner tank of the electrolytic cell is tilted 20°~40°.

Advantageously, a passage hole of 2~4 mm is arranged in the lower portion of the central electrolytic sheet.

Advantageously, the electrolysis device further comprises an artificial intelligence controller, which is electrically connected to the electrolytic cell, used to real-time monitor electrolysis power, electrolyte flow and water flow of the electrolytic cell, and the electrolytic cell feeds back information to the artificial intelligence controller.

The electrolysis device in accordance with embodiments of the present invention has the following technical effects: 1) Electrolysis device without a membrane is utilized, using tap water and hydrochloric acid as raw materials, which have wide range of source and low cost. Due to the absence of membrane, this electrolysis device is easy to operate, and has high efficiency, and no alkaline water is generated during the production process, thus a lot of raw materials can be saved. 2) The electrolytic cell of the electrolysis device is separated into an inner tank and an outer tank, wherein the inner tank is located within the outer tank, sealed and separated with the outer tank, the inner tank is used to contain hydrochloric acid electrolyte, the outer tank is used to circulate tap water, chlorine generated from electrolysis of hydrochloric acid is discharged from the chlorine discharge outlet, and then combined with tap water in the outer tank to generate hypochlorous acid (HClO). Further, tap water circulated in the outer tank can cool the electrolytic sheets in the inner tank, thereby temperature of the electrolytic sheets is reduced so that the impedance of the electrolytic sheets is reduced to avoid affecting output of chlorine. 3) During the electrolysis process, the electrolytic cell is tilted 20°~40° to avoid the poor circulation of the electrolyte. 4) The chlorine discharge outlet is positioned near the hypochlorous water outlet, and its height is higher than the height of the hypochlorous water outlet. Chlorine is mixed with tap water in the mixing area to generate hypochlorous acid. This avoids hydrochloric acid electrolyte being diluted by tap water, and can stabilize output of chlorine. 5) The AI controller is used to control production amount of chlorine in the electrolytic cell, thus the most available hypochlorous water is obtained. In summary, therefore, the electrolysis device for preparation of hypochlorous water of the present invention has simple structure, and can effectively improve productivity of hypochlorous water. Hypochlorous water produced by this electrolysis device has functions of sterilization and environmental protection.

BRIEF DESCRIPTION OF THE DRAWINGS

The accompanying drawings illustrate one or more embodiments of the invention and, together with the written description, serve to explain the principles of the invention, and wherein.

DETAILED DESCRIPTION OF THE INVENTION

These and other aspects of the present invention will become apparent from the following description of the preferred embodiment taken in conjunction with the following drawings. It should be understood that the embodiments described here are only for the purposes of illustration and description and is not intended to be exhaustive or to limit the invention to the precise forms disclosed.

Figure 1:
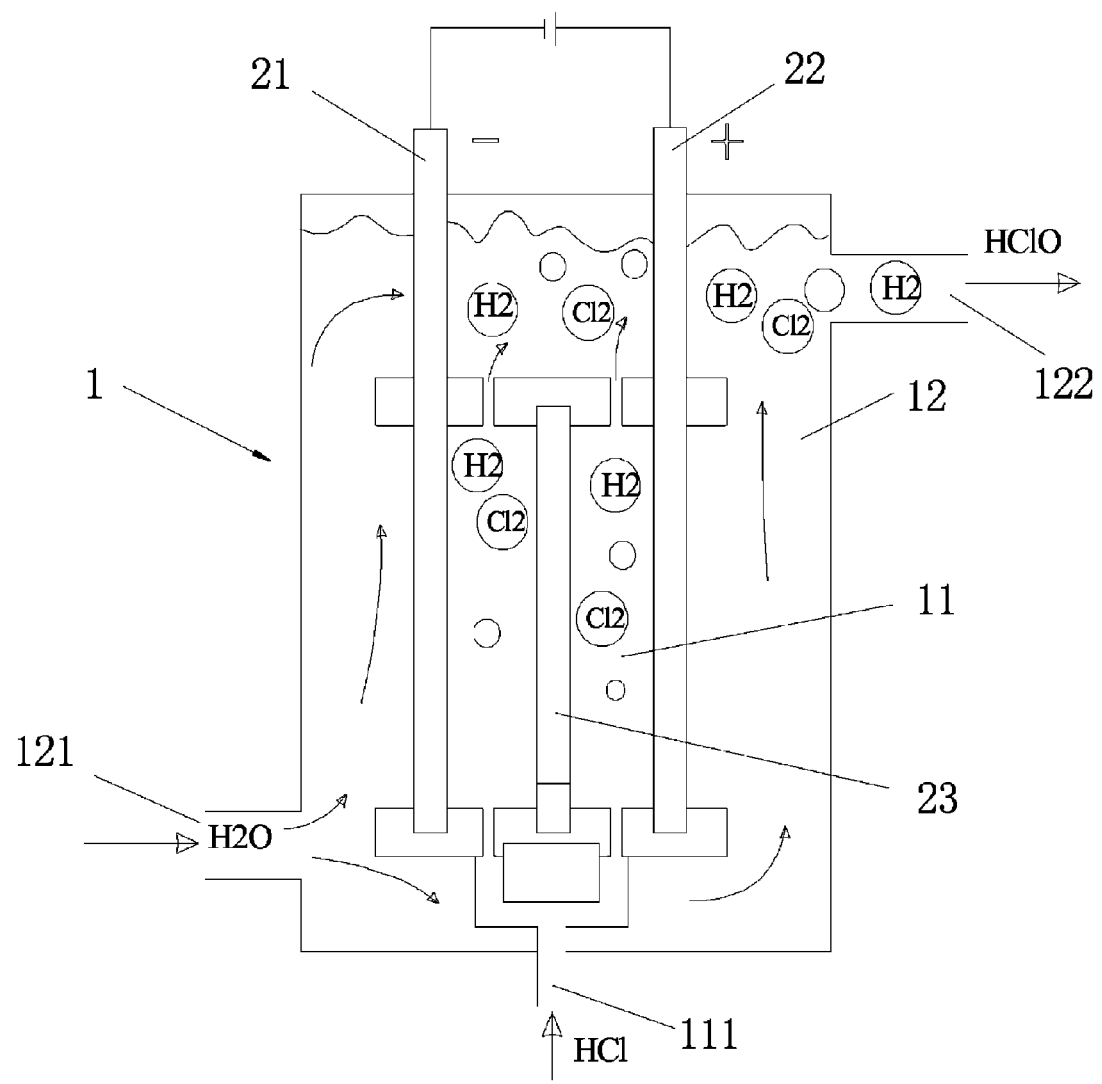
FIG. 1 is a structural diagram of the electrolysis device for preparation of hypochlorous water in accordance with an embodiment of the present invention.

FIG. 1 is a structural diagram of the electrolysis device for preparation of hypochlorous water in accordance with a preferred embodiment of the present invention. As shown in FIG. 1, the electrolysis device for preparation of hypochlorous water comprises a electrolytic cell 1, and electrolytic sheets 2 arranged in the electrolytic cell 1, wherein the electrolytic sheets 2 includes a cathodic electrolytic sheet 21 and an anodic electrolytic sheet 22. The principle for generating hypochlorous water of the present invention is: hydrochloric acid (HCl) and tap water ($H_2O$) are used as raw material, and the hydrochloric acid (HCl) is electrolyzed through the cathodic and anodic electrolytic sheets 21, 22, which are connected to DC voltage, to generate hydrogen ($H_2$) and chlorine ($Cl_2$), then tap water ($H_2O$) supplied into the electrolytic cell 1 reacts with chlorine ($Cl_2$) to generate hydrochloric acid (HCl) and hypochlorous acid (HClO). The hypochlorous water prepared by the electrolysis device has sterilization and environmental protection effects, and can be used as food additives, or used to produce disinfectant.

Figure 2:
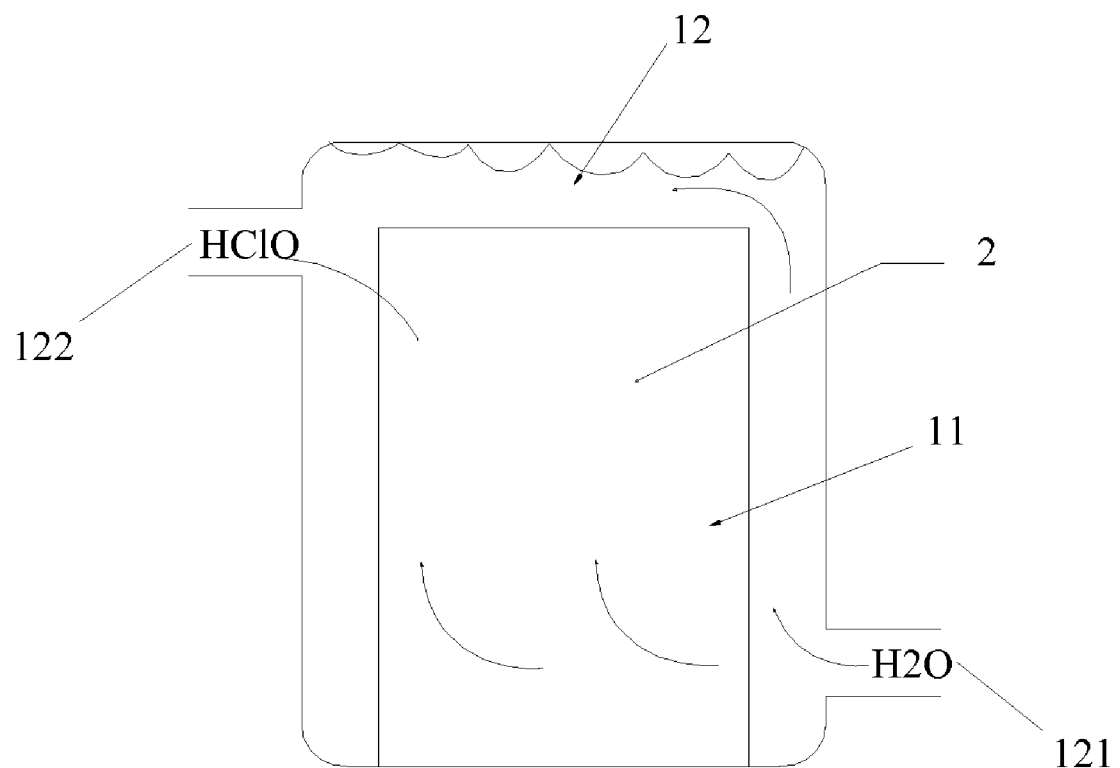
FIG. 2 is a schematic diagram of the cooling structure of the electrolysis device in accordance with an embodiment of the present invention.

The main improvements of this invention lies in how to stabilize the structure of the electrolytic cell involved in the generation of the hypochlorous water:

1. Cooling structure of the electrolytic cell for cooling the electrolytic sheets FIG. 2 is a schematic diagram of the cooling structure of the electrolysis device in accordance with an embodiment of the present invention. As shown in FIG. 2, the electrolytic cell 1 is separated to form an inner tank 11 for containing hydrochloric acid (HCl) (i.e., the electrolyte) and an outer tank 12 for circulating tap water ($H_2O$). An central portion of the inner tank 11 is sealed and separated relative to the outer tank 12. The central portion of the inner tank 11 forms a inner space for containing the hydrochloric acid. The cathodic and anodic electrolytic sheets 21, 22 are located at both sides of the inner tank 11. The outer tank 12 surrounds the inner tank 11, forming an outer space to contain tap water. An inlet 121 for supplying tap water ($H_2O$) is provided at the lower side of the outer tank 12, and an outlet 122 for discharging hypochlorous water (HClO) is provided at the upper side of the outer tank 12. Both the inlet 121 and the outlet 122 are connected to the outer space.

During the electrolysis process, heat is generated due to high current passing through the electrolytic sheets, which causes temperature of the electrolytic sheets rising, impedance increasing, thereby current flow is reduced to impact chlorine output. With the above-mentioned structure of the present invention, tap water is introduced into the outer space from the inlet 121 of the outer tank 12. Since tap water surrounds the inner tank 11, the electrolytic sheets in the inner tank 11 can be cooled effectively, thus the impedance of the electrolytic sheets is reduced to avoid affecting output amount of chlorine.

Figure 3:
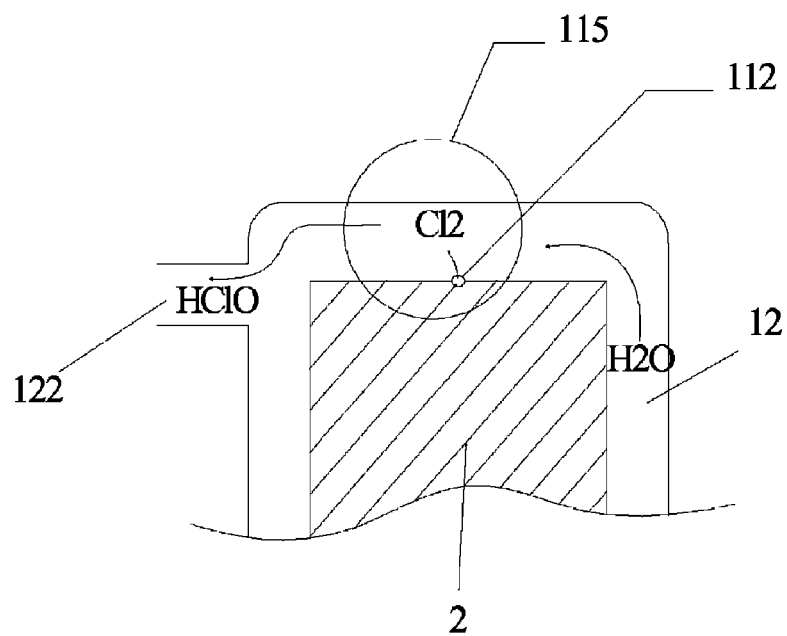
FIG. 3 is a schematic diagram of the generation structure of the electrolysis device in accordance with an embodiment of the present invention.
Figure 4:
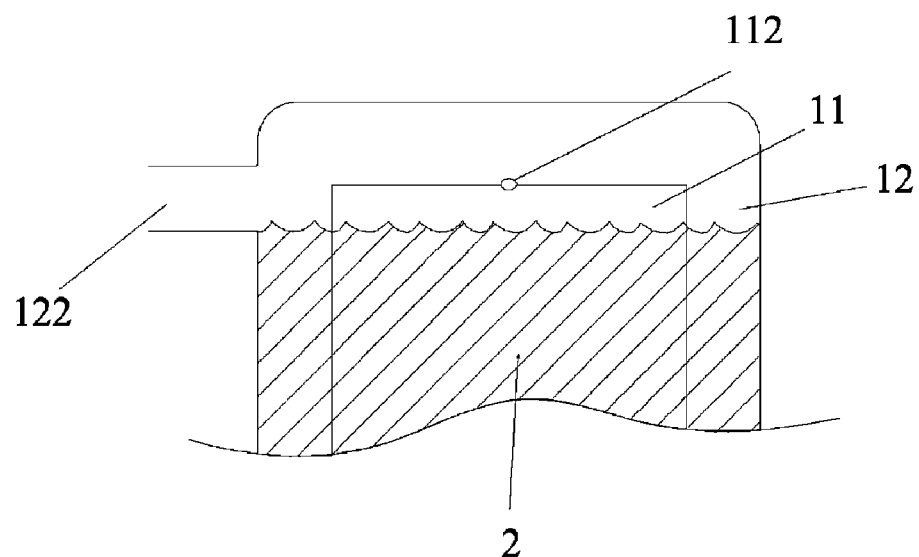
FIG. 4 is diagram of the generation structure of the electrolysis device in accordance with another embodiment of the present invention.

2. Generation structure of the electrolytic cell for stably generating hypochlorous water Referring to FIG. 1, FIG. 3 and FIG. 4, FIG. 3 is a schematic diagram of the generation structure of the electrolysis device in accordance with an embodiment of the present invention. Based on the above-mentioned structure, further, an electrolyte inlet 111 (See FIG. 1) for introducing hydrochloric acid is arranged at the lower end of the inner tank 11, and a chlorine discharge outlet 112 connected to the outer tank is arranged at the upper end of the inner tank 11. Both the electrolyte inlet 111 and the chlorine discharge outlet 112 are connected to the inner space within the inner tank 11. The outlet 122 for discharging hypochlorous water is close to the chlorine discharge out 112 in order to avoid change of the output of the chlorine due to unstable pressure in the electrolytic cell 1, which will affect the mixing ratio of tap water and chlorine. In this embodiment, the chlorine discharge outlet 112 is located at the upper end of the inner tank 11, near the outlet 122. A mixing area 115 of chlorine ($Cl_2$) and tap water ($H_2O$) is formed at the chlorine discharge outlet 112. chlorine ($Cl_2$) is mixed with tap water ($H_2O$) in this mixing area 115 to generate hydrochloric acid (HCl) and hypochlorous acid (HClO), then hypochlorous water is obtained and flows out from the outlet 122.

Also should be noted is that, in normal operation, hydrochloric acid will not be diluted by water. FIG. 4 is a diagram of the generation structure of the electrolysis device in accordance with another embodiment of the present invention. Referring to FIG. 4, the location of the chlorine discharge outlet 112 is higher than that of the outlet 122. FIG. 4 shows the case when stop supplying tap water. Water level of the outer tank 12 will decrease below the height of the chlorine discharge outlet 122, to avoid tap water flowing into the inner tank 11 and diluting the electrolyte. Therefore, the above-mentioned structure of the present invention avoids the hydrochloric acid being diluted by tap water.

Figure 5:
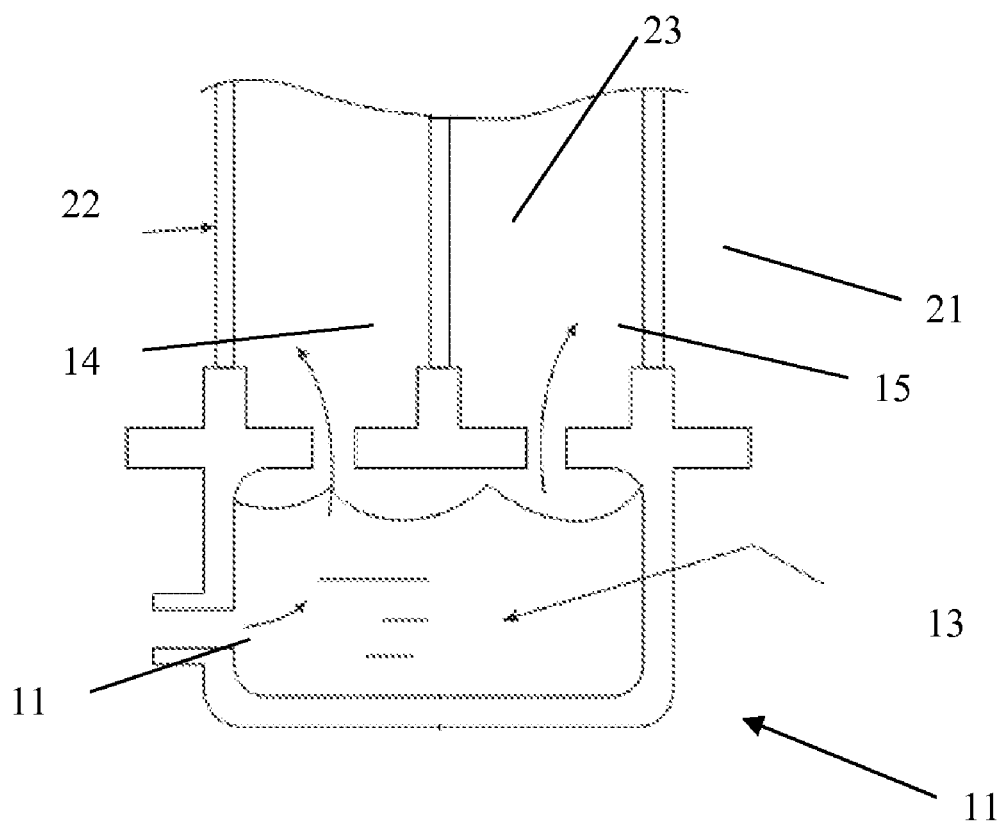
FIG. 5 is a structural diagram of an exemplary inner tank as shown in FIG. 1.
Figure 6:
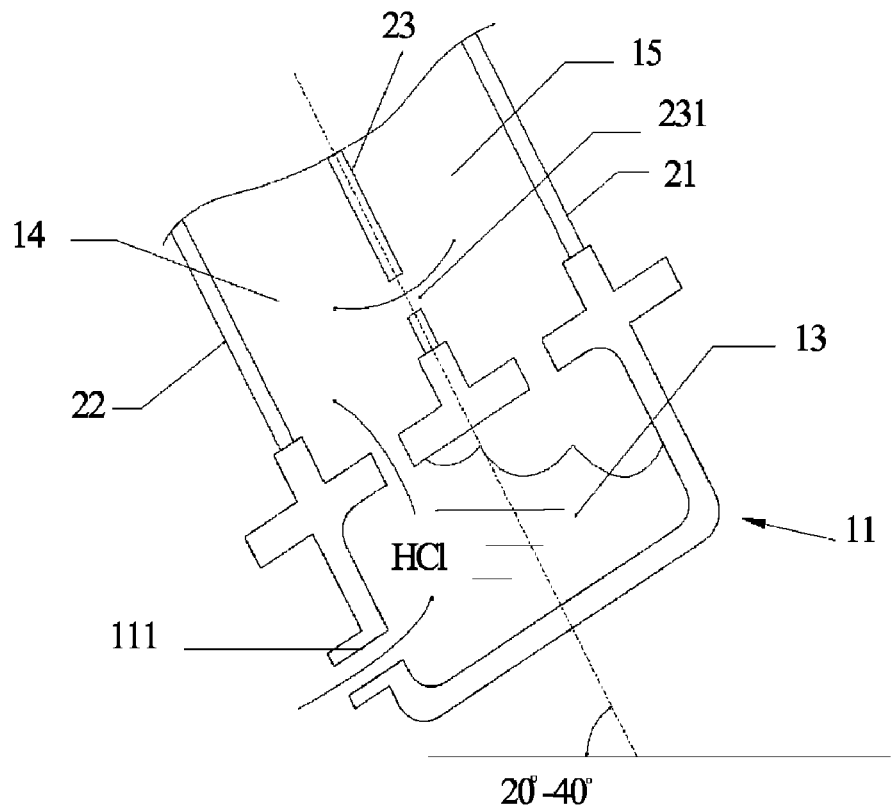
FIG. 6 is a structural diagram of a preferred inner tank as shown in FIG. 1.

3. Structure and arrangement of the electrolytic cell for a steady supply of hydrochloric acid electrolyte See FIG. 5 and FIG. 6, on the basis of the above-mentioned structure, the inner tank 11 of the present invention may be a multi-section inner tank. FIG. 5 is an embodiment of the inner tank as shown in FIG. 1. A central electrolytic sheet 23 is arranged in the central portion of the inner tank 11. The electrolytic sheet 23 separates the inner tank 11 into section A 13, section B 14 and section C 15, wherein the section A 13 is a electrolyte buffer area, the section B 14 and section C 15 are electrolysis area. A electrolyte inlet 111 is provided in the section A 13. A cathodic electrolytic sheet 21 and an anodic electrolytic sheet 22 are arranged in the section C and the section B respectively. The use of the central electrolytic sheet 23 can provide a buffer for hydrochloric acid (HCl) to optimize electrolysis effect. In this embodiment, the multi-section inner tank is upright positioned and sealed independently, only one electrolyte inlet and one outlet is provided thereon. However, since in the multi-section inner tank, the electrolyte will flow from the section A 13 into the section B 14 and the section C 15, loss of synchronization will appear due to pressure difference of the section B 14 and the section C 15. The electrolyte will firstly flow from the low-pressure section until pressure in the other section decreases to a level allowing the electrolyte flow into. Thus, amount of the electrolyte in the inner tank will more than the budget amount. The excessive electrolyte will increase current flow, to generate excessive chlorine, thus the concentration of hypochlorous acid is increased and the acidity of hypochlorous water drops. Such hypochlorous water is less stable. Therefore, FIG. 6 shows structure of the inner tank of a electrolytic cell in accordance with a preferred embodiment of the present invention. This inner tank is distinguished from the above-mentioned inner tank that the electrolytic cell 1 is tilted 20°~40° so that the inner tank 11 is also tilted 20°~40°, or the inner tank 11 is positioned directly inclined 20°~40°. A passage hole 231 of 2~4 mm is provided in the lower portion of the central electrolytic sheet 23. During the electrolysis process, the electrolyte can not be pumped into too fast. The electrolyte will enter from section A 13 into section B 14, and then convect from section B 14 into section C 15. If the amount of the electrolyte entering into section B is insufficient or the channel is blocked, then the electrolyte will enter into section C 15 from section A 13, and then flow through the passage hole 231 into section B 14. In this way, flow control of the electrolyte is more convenient, to avoid the electrolyte within the tank being more than the budget amount, thus hypochlorous water is more stable.

Figure 7:
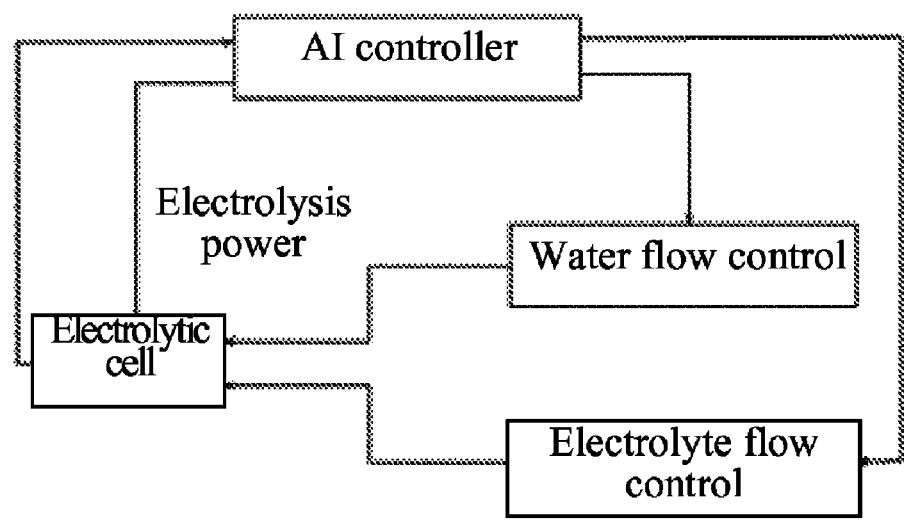
FIG. 7 is a schematic diagram for control of the electrolysis device for preparation of hypochlorous water in accordance with an embodiment of the present invention.

4. Intelligent control method of the electrolytic cell for preparation of available hypochlorous water FIG. 7 is a schematic diagram for control of the electrolysis device for preparation of hypochlorous water in accordance with an embodiment of the present invention. The electrolysis device further comprises an artificial intelligence (AI) controller, which is electrically connected to the electrolytic cell, using electrolysis power, electrolyte flow and water flow as the control loop parameters. The AI controller real-time monitors the electrolysis power, electrolyte flow and water flow of the electrolytic cell. The electrolytic cell feeds back information to the AI controller to control chlorine production in the electrolytic cell through the AI controller, thus the most available hypochlorous water. The AI controller can be achieved through existing technologies.

The electrolysis device for preparation of hypochlorous water in accordance with the present invention has the following characteristics: 1) Electrolysis device without a membrane is utilized, using tap water and hydrochloric acid as raw materials, which have wide range of source and low cost. Due to the absence of membrane, this electrolysis device is easy to operate, and has high efficiency, and no alkaline water is generated during the production process, thus a lot of raw materials can be saved. 2) The electrolytic cell of the electrolysis device is separated into an inner tank and an outer tank, wherein the inner tank is located within the outer tank, sealed and separated with the outer tank, the inner tank is used to contain hydrochloric acid electrolyte, the outer tank is used to circulate tap water, chlorine generated from electrolysis of hydrochloric acid is discharged from the chlorine discharge outlet, and then combined with tap water in the outer tank to generate hypochlorous acid (HClO). Further, tap water circulated in the outer tank can cool the electrolytic sheets in the inner tank, thereby temperature of the electrolytic sheets is reduced so that the impedance of the electrolytic sheets is reduced to avoid affecting output of chlorine. 3) During the electrolysis process, the electrolytic cell is tilted 20°~40° to avoid the poor circulation of the electrolyte. 4) The chlorine discharge outlet is positioned near the hypochlorous water outlet, and its height is higher than the height of the hypochlorous water outlet. Chlorine is mixed with tap water in the mixing area to generate hypochlorous acid. This avoids hydrochloric acid electrolyte being diluted by tap water, and can stabilize output of chlorine. 5) The AI controller is used to control production amount of chlorine in the electrolytic cell, thus the most available hypochlorous water is obtained. In summary, therefore, the electrolysis device for preparation of hypochlorous water of the present invention has simple structure, and can effectively improve productivity of hypochlorous water. Hypochlorous water produced by this electrolysis device has functions of sterilization and environmental protection.

The foregoing description of the exemplary embodiments of the invention has been presented only for the purposes of illustration and description and is not intended to be exhaustive or to limit the invention to the precise forms disclosed. Many modifications and variations are possible in light of the above teaching without departing from the protection scope of the present invention.

What is claimed is:

1. An electrolysis device for preparation of hypochlorous water, comprising an electrolytic cell, and cathodic and anodic electrolytic sheets arranged in the electrolytic cell, wherein the electrolytic cell is separated to form an inner tank for containing hydrochloric acid and an outer tank for circulating tap water, a central portion of the inner tank is sealed and separated relative to the outer tank, and a chlorine discharge outlet connected to the outer tank is provided at the upper end of the inner tank; the cathodic and anodic electrolytic sheets are located on both sides of the inner tank;

the inner tank forms an inner space in its central portion to contain hydrochloric acid electrolyte, an electrolyte inlet for introducing hydrochloric acid is arranged at the lower end of the inner tank, and both the electrolyte inlet and the chlorine discharge outlet are connected to the inner space;

a central electrolytic sheet is arranged in the central portion of the inner tank, separating the inner tank into section A, section B and section C, wherein the section A is an electrolyte buffer area, the section B and the section C are electrolysis areas, and the electrolyte inlet is arranged in the section A, the cathodic and anodic electrolytic sheets are arranged in the section C and the section B respectively;

the inner tank of the electrolytic cell is tilted 20°~40°, and a passage hole is arranged in the lower portion of the central electrolytic sheet.

2. The electrolysis device according to claim 1, wherein the outer tank forms an outer space therein to contain tap water, and an inlet for supplying tap water is arranged at the lower side of the outer tank, an outlet for discharging hypochlorous water is arranged at the upper side of the outer tank, both the inlet and the outlet are connected to the outer space.

3. The electrolysis device according to claim 2, wherein the chlorine discharge outlet is positioned at the upper end of the inner tank, near the outlet for discharging hypochlorous water.

4. The electrolysis device according to claim 2 or 3, wherein the height of the chlorine discharge outlet is higher than that of the outlet for discharging hypochlorous water.

5. The electrolysis device according to claim 1, wherein the electrolysis device further comprises an artificial intelligence controller, which is electrically connected to the electrolytic cell, used to real-time monitor electrolysis power, electrolyte flow and water flow of the electrolytic cell, and the electrolytic cell feeds back information to the artificial intelligence controller.

* * * * *